(12) United States Patent
Cong et al.

(10) Patent No.: US 8,570,740 B2
(45) Date of Patent: Oct. 29, 2013

(54) ELECTRONIC DEVICE WITH EXPANSION CARDS

(75) Inventors: Wei-Dong Cong, Shenzhen (CN); Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 214 days.

(21) Appl. No.: 13/282,479

(22) Filed: Oct. 27, 2011

(65) Prior Publication Data

US 2013/0077240 A1 Mar. 28, 2013

(30) Foreign Application Priority Data

Sep. 23, 2011 (CN) .......................... 2011 1 0285841

(51) Int. Cl.
*H05K 7/20* (2006.01)
(52) U.S. Cl.
USPC ... 361/694; 361/690; 361/679.49; 361/679.5; 361/721; 454/184

(58) Field of Classification Search
None
See application file for complete search history.

(56) References Cited

U.S. PATENT DOCUMENTS

| | | | |
|---|---|---|---|
| 7,379,297 B2 * | 5/2008 | Peterson et al. | 361/690 |
| 7,542,289 B2 * | 6/2009 | Tsai et al. | 361/695 |
| 7,599,180 B2 * | 10/2009 | Ong et al. | 361/679.51 |
| 7,643,289 B2 * | 1/2010 | Ye et al. | 361/690 |
| 7,654,840 B1 * | 2/2010 | Zapata et al. | 439/196 |
| 8,102,651 B2 * | 1/2012 | Bland et al. | 361/695 |
| 8,373,986 B2 * | 2/2013 | Sun | 361/695 |
| 2010/0020487 A1 * | 1/2010 | Lee et al. | 361/679.49 |

* cited by examiner

*Primary Examiner* — Boris Chervinsky
(74) *Attorney, Agent, or Firm* — Altis & Wispro Law Group, Inc.

(57) ABSTRACT

An electronic device includes a circuit board with a number of expansion slots arranged on the circuit board for connecting a number of expansion cards, and a guiding member inserted in one idle expansion slot of the expansion slots for guiding airflow to the expansion cards at opposite sides of the idle expansion slot.

10 Claims, 4 Drawing Sheets

ELECTRONIC DEVICE WITH EXPANSION CARDS

BACKGROUND

1. Technical Field

The present disclosure relates to an electronic device having expansion cards.

2. Description of Related Art

Electronic devices, such as computers, use expansion cards to expand functions. The electronic device usually includes a plurality of expansion slots set on a circuit board for connecting the expansion cards. However, while one or more expansion slots are used for connecting expansion cards, the other expansion slots may be idle, which forms some wide spaces between the idle expansion slots. The airflow from fans will flow easily through the wide spaces but not to the expansion cards, which makes heat dissipation inefficient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
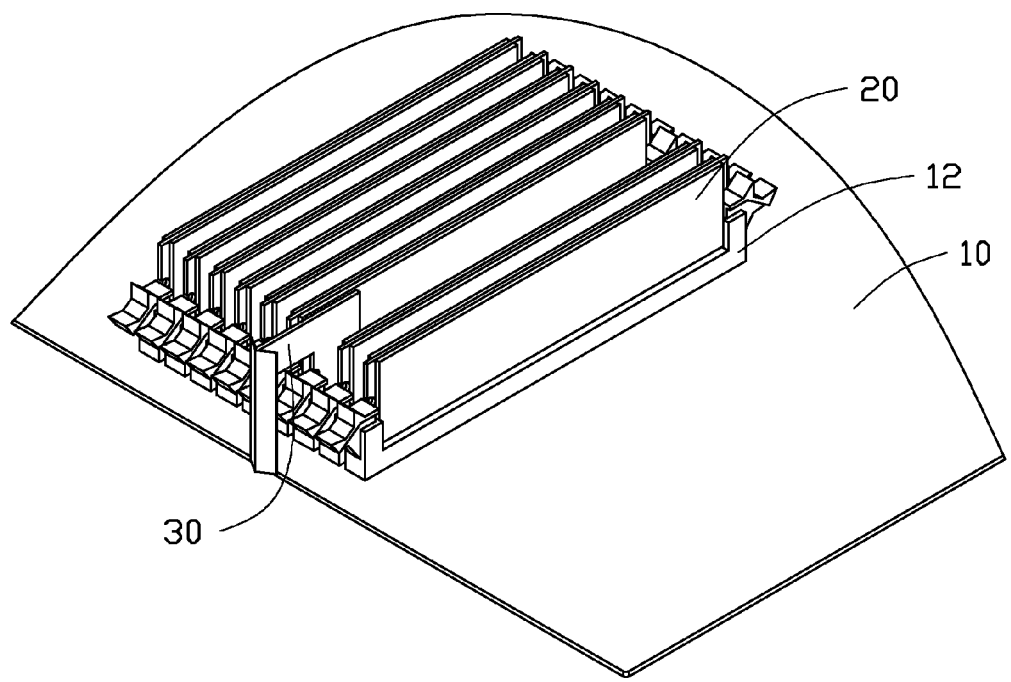
FIG. 1 is an assembled, isometric view of a first embodiment of an electronic device.
Figure 2:
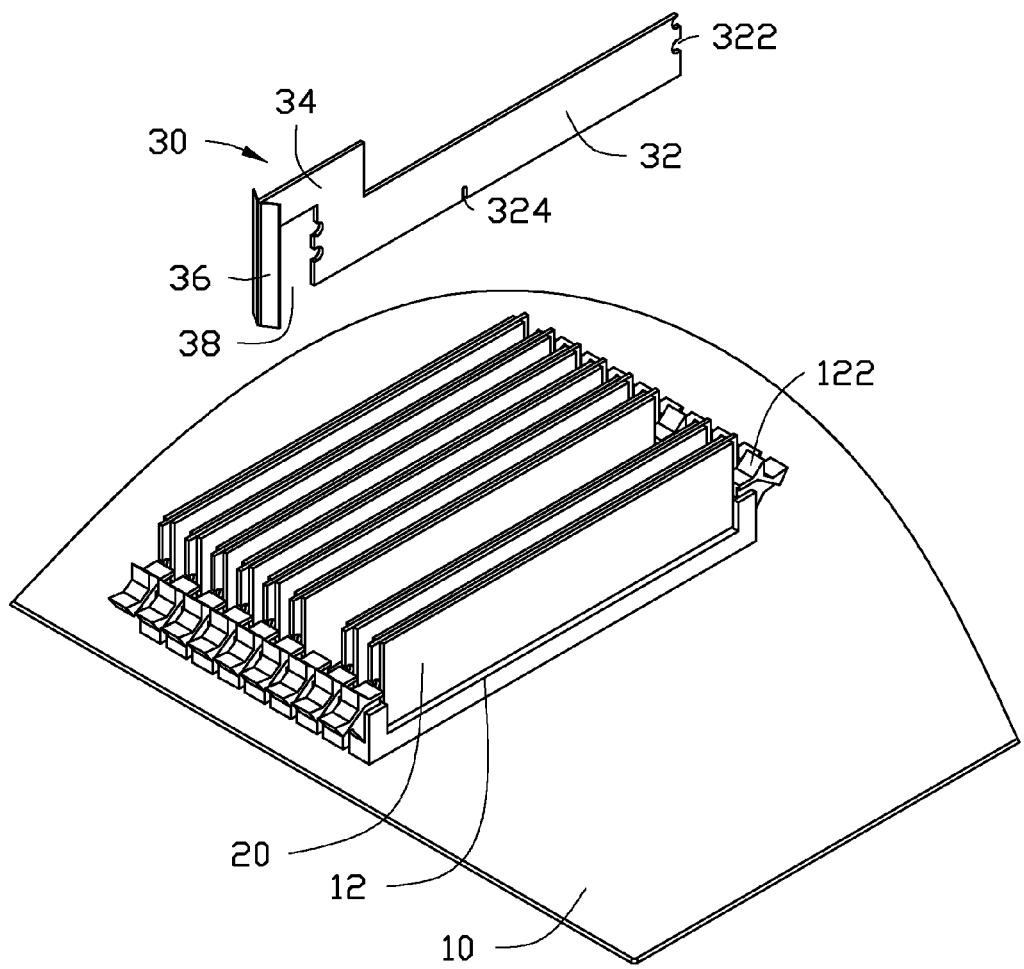
FIG. 2 is an exploded, isometric view of the electronic device of FIG. 1.

Referring to FIG. 1 and FIG. 2, a first embodiment of an electronic device includes a circuit board 10, a plurality of expansion cards 20, and an air guiding member 30.

The circuit board 200 includes a plurality of expansion slots 12 for connecting the expansion cards 20. Two locking portions 122 are set on two opposite ends of each expansion slot 12.

The air guiding member 30 includes an inserting portion 32 and a guiding portion 36 formed from a first end of the inserting portion 32. The inserting portion 32 defines two locking cutouts 322 in the first end and a second end of inserting portion 32 opposite to the first end. A cutout 324 is defined in an edge of the inserting portion 32. The inserting portion 32 includes an L-shaped connecting piece 34 that extends up from the first end of the inserting portion 32 and connects to the guiding portion 36.

The guiding portion 36 has a V-shaped cross-section. A top portion of the guiding portion 36 is connected to an end of the connecting piece 34 opposite to the inserting portion 32. A space 38 is defined between the guiding portion 36 and the first end of the inserting portion 32.

In use, the inserting portion 32 is inserted into an idle expansion slot 12. The cutout 324 avoids interference with a foolproof portion (not shown). The locking portions 122 are respectively engaged in the locking cutouts 322. The guiding portion 36 cantilevers in front of an end of the idle expansion slot 12. The space 38 avoids interference with the locking portion 122 at the end of the idle expansion slot 12. When airflow from fans flows to the electronic device, the guiding portion 36 guides the airflow to the expansion cards 20 at opposite sides of the idle expansion slot 12.

Figure 3:
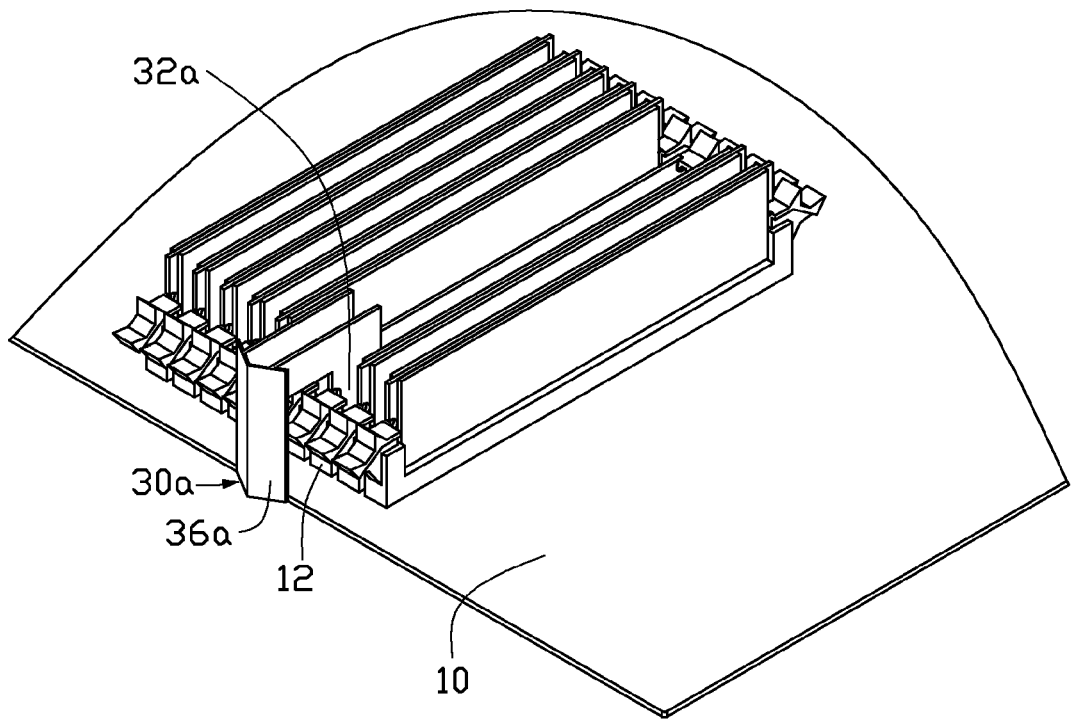
FIG. 3 is an assembled, isometric view of a second embodiment of an electronic device.

Referring to FIG. 3, a second embodiment of an electronic device includes an air guiding member 30a fit for a circuit board 10 having two adjacent idle expansion slots 12. The guiding member 30a includes two inserting portions 32a respectively inserted into the idle expansion slots 12, and a large guiding portion 36a connected to corresponding ends of the inserting portions 32a.

Figure 4:
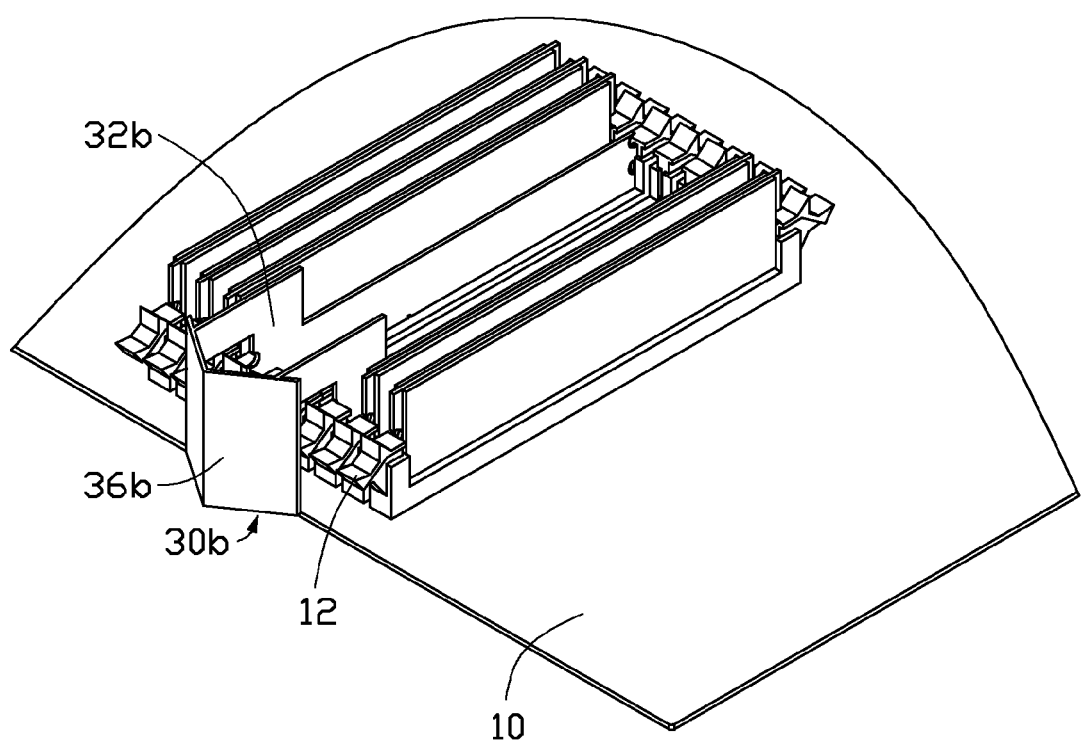
FIG. 4 is an assembled, isometric view of a third embodiment of an electronic device.

Referring to FIG. 4, a third embodiment of an electronic device includes an air guiding member 30b fit for a circuit board 10 having three adjacent idle expansion slots 12. The guiding member 30b includes two inserting portions 32b respectively inserted into the outside expansion slots 12, and a large guiding portion 36b connected to corresponding ends of the inserting portions 32b.

It is believed that the present embodiments and theirs advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. An electronic device comprising:
   a circuit board comprising a plurality of expansion slots for connecting to a plurality of expansion cards, wherein at least one expansion slot is idle; and
   a guiding member inserted into the at least one idle expansion slot, the guiding member comprising a guiding portion located in front of an end of the at least one expansion slot, for guiding airflow to flow to opposite sides of the at least one expansion slot.

2. The electronic device of claim 1, wherein the guiding portion has a substantially V-shaped cross-section.

3. The electronic device of claim 2, wherein the guiding member further comprises an inserting portion inserted into one of the at least one idle expansion slot, the guiding portion is formed from one end of the inserting portion.

4. The electronic device of claim 3, wherein opposite ends of the inserting portion define two locking cutouts, two locking portions are formed at opposite ends of each of the at least one expansion slot to engage in the locking cutouts, respectively.

5. The electronic device of claim 4, wherein the inserting portion comprises an L-shaped connecting piece extending up from the end of the inserting portion, the guiding portion is connected to the connecting piece.

6. The electronic device of claim 5, wherein a space is defined between the guiding portion and the end of the inserting portion, for avoiding interference with the locking portion at the end of the corresponding idle expansion slot.

7. An electronic device comprising:
   a circuit board comprising a plurality of expansion slots for connecting to a plurality of expansion cards, wherein two expansion slots are idle; and
   a guiding member comprising two inserting portions inserted into the idle expansion slots, respectively, and a guiding portion connected to corresponding ends of the inserting portions, for guiding airflow to flow to opposite sides of the idle expansion slots.

8. The electronic device of claim 7, wherein the two idle expansion slots are adjacent.

9. An electronic device comprising:
   a circuit board comprising a plurality of expansion slots for connecting to a plurality of expansion cards, wherein three expansion slots are idle; and
   a guiding member comprising two inserting portions inserted into two outside idle expansion slots, respectively, and a guiding portion connected to corresponding ends of the inserting portions, for guiding airflow to flow to opposite sides of the idle expansion slots.

10. The electronic device of claim 9, wherein the three idle expansion slots are adjacent.

* * * * *